(12) United States Patent
Lei

(10) Patent No.: US 12,184,430 B2
(45) Date of Patent: Dec. 31, 2024

(54) METHOD AND APPARATUS FOR DETERMINING ONE SHOT HARQ-ACK CODEBOOK

(71) Applicant: Lenovo (Beijing) Ltd., Beijing (CN)

(72) Inventor: Haipeng Lei, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 0 days.

(21) Appl. No.: 17/769,526

(22) PCT Filed: Nov. 8, 2019

(86) PCT No.: PCT/CN2019/116697
§ 371 (c)(1),
(2) Date: Apr. 15, 2022

(87) PCT Pub. No.: WO2021/087980
PCT Pub. Date: May 14, 2021

(65) Prior Publication Data
US 2024/0154733 A1 May 9, 2024

(51) Int. Cl.
*H04L 1/1829* (2023.01)
*H04L 1/1822* (2023.01)

(52) U.S. Cl.
CPC .......... *H04L 1/1864* (2013.01); *H04L 1/1822* (2013.01)

(58) Field of Classification Search
CPC ... H04L 1/1864; H04L 1/1822; H04L 1/1671; H04L 1/1685
USPC ........................................ 370/310, 328, 329
See application file for complete search history.

(56) References Cited

U.S. PATENT DOCUMENTS

| | | | |
|---|---|---|---|
| 2010/0169733 A1 | 7/2010 | Kim et al. | |
| 2011/0078528 A1* | 3/2011 | Ohtaki | H04L 1/187 714/E11.131 |
| 2017/0280454 A1* | 9/2017 | Kusashima | H04W 28/04 |
| 2018/0205504 A1* | 7/2018 | Lyu | H04L 5/0055 |
| 2019/0297642 A1* | 9/2019 | Sun | H04L 1/1887 |
| 2019/0363840 A1* | 11/2019 | Wang | H04L 1/1864 |
| 2020/0228296 A1* | 7/2020 | Su | H04W 72/04 |

(Continued)

FOREIGN PATENT DOCUMENTS

WO 2018174598 A1 9/2018

OTHER PUBLICATIONS 201980102017.9 , "Foreign Office Action", CN Application No. 201980102017.9, Nov. 1, 2023, 10 pages.

(Continued)

*Primary Examiner* — Obaidul Huq
(74) *Attorney, Agent, or Firm* — FIG. 1 Patents

(57) ABSTRACT

The subject disclosure relates to a method and apparatus for determining a one shot HARQ-ACK codebook. In one embodiment, the subject disclosure provides a method performed by a User Equipment (UE), including receiving, from a base station (BS), a signaling configuring a plurality of Downlink (DL) Hybrid Automatic Repeat reQuest (HARQ) processes, and Downlink Control Information (DCI) requesting HARQ-ACK feedback for each of the plurality of DL HARQ processes; for each of the plurality of DL HARQ processes, generating the HARQ-ACK feedback based on an associated New Data Indicator (NDI) bit and HARQ-ACK information bit; and transmitting, to the BS, a HARQ-ACK codebook comprising the HARQ-ACK feedback for each of the plurality of DL HARQ processes.

20 Claims, 10 Drawing Sheets

(56) References Cited

U.S. PATENT DOCUMENTS

| | | | | |
|---|---|---|---|---|
| 2020/0344012 A1* | 10/2020 | Karaki | .................. | H04W 72/23 |
| 2021/0368541 A1* | 11/2021 | Hedayat | .................. | H04L 5/005 |
| 2022/0159691 A1* | 5/2022 | Chen | ..................... | H04L 1/1887 |
| 2022/0166555 A1* | 5/2022 | Takeda | .................... | H04L 1/188 |

OTHER PUBLICATIONS

"International Search Report and Written Opinion", PCT Application No. PCT/CN2019/116697, Jul. 27, 2020, 6 pages.

NEC , "HARQ enhancement for NR-U", 3GPP TSG-RAN WG1 Meeting #98bis, R1-1910571, Chongqing, China, Oct. 2019, 4 pages.

PCT/CN2019/116697 , "International Preliminary Report on Patentability", PCT Application No. PCT/CN2019/116697, May 19, 2022, 5 pages.

Qualcomm Incorporated , "Enhancements to Scheduling and HARQ operation for NR-U", 3GPP TSG RAN WG1 Meeting #98bis, R1-1911099, Chongqing, CN, Oct. 2019, 17 pages.

Samsung , "HARQ enhancement for NR-U", 3GPP TSG-RAN WG1 Meeting #98bis, R1-1910461, Chongqing, China, Oct. 2019, 8 pages.

19952132.9 , "Extended European Search Report", EP Application No. 19952132.9, Jul. 7, 2023, 7 pages.

Ericsson , "HARQ and scheduling enhancements for NR-U", 3GPP TSG-RAN WG1 Meeting #97, R1-1907456, Reno, NV, USA [retrieved Aug. 4, 2023]. Retrieved from the Internet <https://www.3gpp.org/ftp/tsg_ran/WG1_RL1/TSGR1_97/Docs?sortby=namerev>, May 2019, 15 pages.

Qualcomm Incorporated , "Summary of NR-U agreements till RAN1 #98", 3GPP TSG RAN WG1 Meeting #99, R1-1911721, Reno, USA [retrieved Aug. 4, 2023]. Retrieved from the Internet <https://www.3gpp.org/ftp/tsg_ran/WG1_RL1/TSGR1_98b/Docs>, Nov. 2019, 26 pages.

* cited by examiner

| Field | Bit size | comments |
|---|---|---|
| Triggering indicator | 1 | Newly added, "1": triggering; "0": not triggering |
| Identifier | 1 | The first 16 bits of these fields are reused as max 16 latest transmitted NDI bits with each bit per HARQ process |
| Frequency domain resource assignment | Dependent on BW | |
| Time domain resource assignment | 4 | |
| VRB-to-PRB mapping | 1 | |
| MCS | 5 | |
| NDI | 1 | |
| RV | 2 | |
| HARQ process number | 4 | |
| Counter DAI | 2 | |
| TPC command for scheduled PUCCH | 2 | Used for PUCCH |
| PUCCH resource indicator | 3 | Used for PUCCH |
| PDSCH-to-HARQ_feedback timing indicator | 3 | Used for PUCCH |

Figure 3

| Field | Bit size | comments |
|---|---|---|
| Identifier | 1 | Reserved to "0" as triggering indicator |
| Frequency domain resource assignment | Dependent on BW | Reserved to all "0" as triggering indicator |
| Time domain resource assignment | 4 | Reused as latest transmitted NDI bits for the $1^{st} \sim 4^{th}$ HARQ processes |
| VRB-to-PRB mapping | 1 | Reserved to "0" as triggering indicator |
| MCS | 5 | Reused as latest transmitted NDI bits for the $5^{th} \sim 9^{th}$ HARQ processes |
| NDI | 1 | Reused as latest transmitted NDI bits for the $10^{th}$ HARQ processes |
| RV | 2 | Reused as latest transmitted NDI bits for the $11^{th} \sim 12^{th}$ HARQ processes |
| HARQ process number | 4 | Reused as latest transmitted NDI bits for the $13^{th} \sim 16^{th}$ HARQ processes |
| Counter DAI | 2 | Reserved to all "0" as triggering indicator |
| TPC command for scheduled PUCCH | 2 | Used for PUCCH |
| PUCCH resource indicator | 3 | Used for PUCCH |
| PDSCH-to-HARQ_feedback timing indicator | 3 | Used for PUCCH |

Figure 4

| Field | Bit size | comments |
|---|---|---|
| Identifier | 1 | The first 16 bits of these fields are reused as max 16 latest transmitted NDI bits with each bit per HARQ process |
| Frequency domain resource assignment | Dependent on BW | |
| Time domain resource assignment | 4 | |
| VRB-to-PRB mapping | 1 | |
| MCS | 5 | |
| NDI | 1 | |
| RV | 2 | |
| HARQ process number | 4 | |
| Counter DAI | 2 | |
| TPC command for scheduled PUCCH | 2 | Used for PUCCH |
| PUCCH resource indicator | 3 | Used for PUCCH |
| PDSCH-to-HARQ_feedback timing indicator | 3 | Used for PUCCH |

Figure 5

METHOD AND APPARATUS FOR DETERMINING ONE SHOT HARQ-ACK CODEBOOK

TECHNICAL FIELD

The subject disclosure relates to the $3^{rd}$ Generation Partnership Project (3GPP) 5G New Radio (NR), especially to a method and apparatus for determining a one shot Hybrid Automatic Repeat reQuest Acknowledgement (HARQ-ACK) codebook.

BACKGROUND OF THE INVENTION

In order to report postponed HARQ-ACK feedback, a User Equipment (UE) would transmit one-shot HARQ-ACK feedback for all the configured downlink HARQ processes to a Base Station (BS). For one-shot HARQ-ACK feedback, the misunderstanding between the BS and the UE in the HARQ-ACK codebook occurs when the UE already reports an ACK for a given HARQ process, but misses the new DL assignment scheduling new data for the given HARQ process. The BS would assume that this ACK corresponds to the new data, and would not retransmit the new data, thus the UE misses the new data.

Therefore, it is necessary to handle the misunderstanding between the BS and the UE.

SUMMARY

The subject disclosure provides several solutions to handle the misunderstanding between the BS and the UE.

One embodiment of the subject disclosure provides a method performed by a User Equipment (UE), including receiving, from a base station (BS), a signaling configuring a plurality of Downlink (DL) Hybrid Automatic Repeat reQuest (HARQ) processes, and Downlink Control Information (DCI) requesting HARQ-ACK feedback for each of the plurality of DL HARQ processes; for each of the plurality of DL HARQ processes, generating the HARQ-ACK feedback based on associated New Data Indicator (NDI) bit and HARQ-ACK information bit; and transmitting, to the BS, a HARQ-ACK codebook comprising the HARQ-ACK feedback for each of the plurality of DL HARQ processes.

Another embodiment of the subject disclosure provides a method performed by a Base Station (BS), including: transmitting, to a User Equipment (UE), a signaling configuring a plurality of Downlink (DL) HARQ processes, and Downlink Control Information (DCI) requesting HARQ-ACK feedback for each of the plurality of DL HARQ processes; and receiving, from the UE, a HARQ-ACK codebook comprising the HARQ-ACK feedback for each of the plurality of DL HARQ processes, wherein the HARQ-ACK feedback for each of the plurality of DL HARQ processes is generated based on associated New Data Indicator (NDI) bit and HARQ-ACK information bit.

Yet another embodiment of the subject disclosure provides an apparatus including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including receiving, from a base station (BS), a signaling configuring a plurality of Downlink (DL) Hybrid Automatic Repeat reQuest (HARQ) processes, and Downlink Control Information (DCI) requesting HARQ-ACK feedback for each of the plurality of DL HARQ processes; for each of the plurality of DL HARQ processes, generating the HARQ-ACK feedback based on associated New Data Indicator (NDI) bit and HARQ-ACK information bit; and transmitting, to the BS, a HARQ-ACK codebook comprising the HARQ-ACK feedback for each of the plurality of DL HARQ processes.

Still another embodiment of the subject disclosure provides an apparatus including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including transmitting, to a User Equipment (UE), a signaling configuring a plurality of Downlink (DL) HARQ processes, and Downlink Control Information (DCI) requesting HARQ-ACK feedback for each of the plurality of DL HARQ processes; and receiving, from the UE, a HARQ-ACK codebook comprising the HARQ-ACK feedback for each of the plurality of DL HARQ processes, wherein the HARQ-ACK feedback for each of the plurality of DL HARQ processes is generated based on associated New Data Indicator (NDI) bit and HARQ-ACK information bit.

BRIEF DESCRIPTION OF THE DRAWINGS

FIG. 3 illustrates a DCI design according to some embodiments of the subject disclosure.

FIG. 4 illustrates another DCI design according to some embodiments of the subject disclosure.

FIG. 5 illustrates yet another DCI design according to some embodiments of the subject disclosure.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

The embodiments provide a method and apparatus for downlink (DL) or uplink (UL) data transmission on an unlicensed or licensed spectrum. To facilitate understanding, the embodiments are provided under specific network architecture and new service scenarios, such as 3GPP 5G, 3GPP LTE Release 8 and so on. Persons skilled in the art know very well that, with the future development of network architecture and new service scenarios, the embodiments in the present disclosure are also applicable to similar technical problems.

Figure 1:
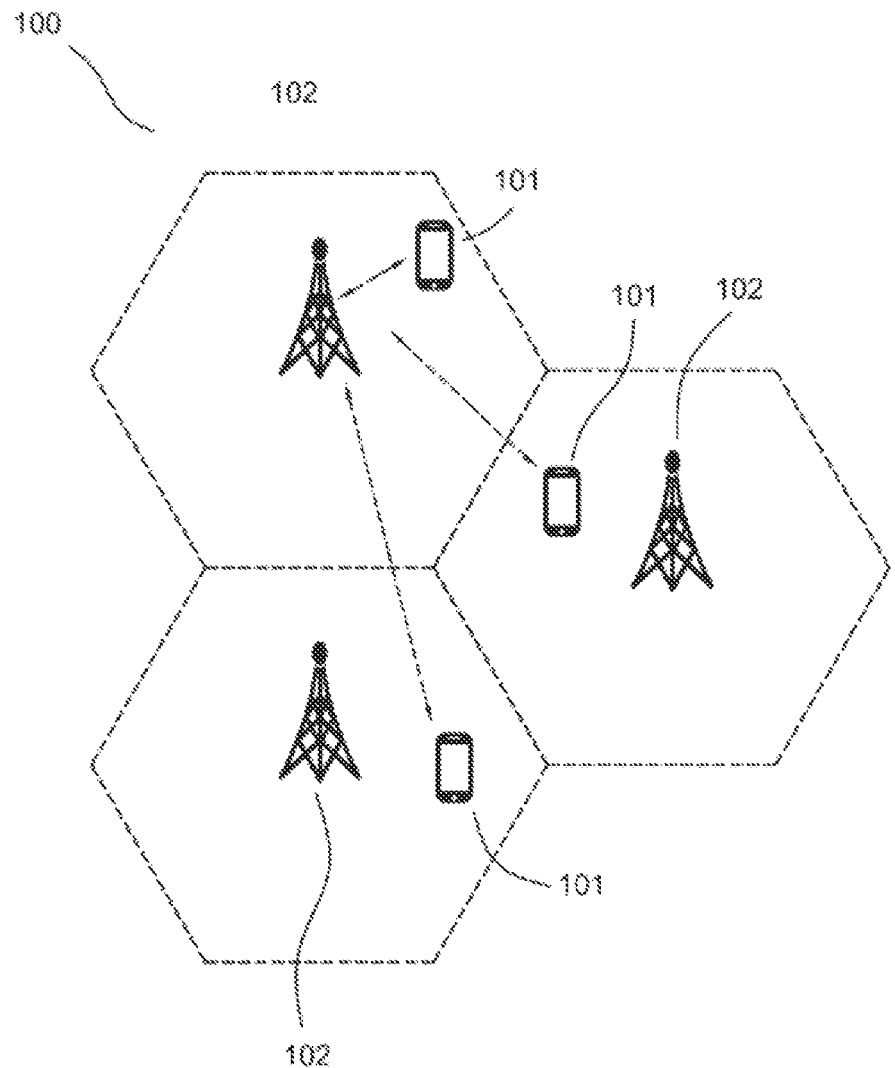
FIG. 1 illustrates a schematic diagram of a wireless communication system according to some embodiments of the subject disclosure.

FIG. 1 illustrates a wireless communication system 100 according to an embodiment of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile phone, a mobile station, a user, a terminal, a mobile terminal, a wireless terminal, a fixed terminal, a subscriber station, a user terminal, or any device described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or any device described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using 3GPP 5G protocols.

The DL TBs (transport blocks) are carried on the Physical Downlink Shared Channel (PDSCH). A maximum of two TBs can be transmitted on PDSCH in one serving cell and in one slot. HARQ-ACK in the subject disclosure represents collectively the Positive Acknowledgement (ACK) and the Negative Acknowledgement (NACK). ACK means a TB is correctly received while NACK means a TB is erroneously received. For the TB-based retransmission, one HARQ-ACK feedback bit corresponds to one TB. A HARQ-ACK information bit value of "0" represents a negative acknowledgement (NACK) while a HARQ-ACK information bit value of "1" represents a positive acknowledgement (ACK). The HARQ-ACK feedback bits corresponding to the PDSCH are transmitted either on a Physical Uplink Control Channel (PUCCH) or on a Physical Uplink Shared Channel (PUSCH).

In NR, besides TB-based retransmission, CBG (code block group)-based retransmission is also supported. The intention of a CBG is to group several code blocks into one code block group wherein the resulting HARQ-ACK feedback is generated per the CBG. Only all the code blocks within one CBG are correctly decoded, the HARQ-ACK for the CBG can be set to "ACK"; otherwise, it is set to "NACK". Upon the reception of the HARQ-ACK feedback, only the CBG(s) with "NACK" shall be retransmitted by the transmitter. For CBG-based retransmission, RRC signaling is used to configure the maximum number of CBGs per TB. The maximum number of CBGs per TB can be 2, 4, 6 and 8. For both the semi-static HARQ-ACK codebook and the dynamic HARQ-ACK codebook, the number of HARQ-ACK bits for one TB is equal to the configured maximum number of CBGs per TB, regardless of the variable TBs of a given TB.

For transmission on an unlicensed spectrum, in order to achieve fair coexistence with other wireless systems, a channel access procedure, i.e., Listen Before Talk (LBT) is required before the transmission on the unlicensed spectrum. By means of performing energy detection on a certain channel, if a received power signal is below a predefined threshold, then the LBT is successful, which means the channel is deemed as empty and available for transmission;

if the received power signal is above the predefined threshold, then the LBT is failed, which means the channel is occupied by other nodes or other wireless systems and is not available for transmission. Only when the LBT is successful, can a device start its transmission on the channel and occupy the channel up to a Maximum Channel Occupancy Time (MCOT); otherwise, the device cannot start transmission and continues to attempt the LBT procedure until a successful LBT channel is achieved.

When HARQ-ACK feedback is to be transmitted on an unlicensed carrier, LBT is needed before the HARQ-ACK transmission. If and only if LBT is successful can a UE start HARQ-ACK transmission; otherwise, the UE has to give up the HARQ-ACK transmission. If the UE fails to transmit HARQ-ACK feedback due to LBT failure, then the corresponding PDSCHs have to be retransmitted since the gNB has no knowledge about the decoding results of the PDSCHs at the UE side.

Additionally, HARQ-ACK transmission on an unlicensed carrier suffers potential interference from hidden nodes. Even if a UE has successfully transmitted the HARQ feedback, there are still possibilities that the gNB may fail to decode it. From the gNB's perspective, if the gNB fails to detect HARQ-ACK feedback in the predefined HARQ-ACK feedback timing, then the gNB will have to assume NACK and retransmit all the corresponding PDSCHs. Both the LBT failure and hidden node problem may lead to unnecessary DL retransmission and DL performance degradation due to failed HARQ-ACK reception at the gNB side.

There are three solutions to solve the aforementioned error case. The first approach is to indicate the NDI for each HARQ process in triggering the DCI. However, this impacts DCI design. Apparently, this is not suitable to use a DL assignment or UL grant the triggering the DCI. The second method is to indicate the latest NDI for each HARQ process in the one-shot HARQ-ACK codebook. The drawback with this is there is too much overhead as the overhead is doubled. The third manner is to always assume NACK for a HARQ process which has been already reported "ACK". The problem is the HARQ-ACK retransmission opportunity is lost.

HARQ-ACK feedback for multiple PDSCHs can be multiplexed in one HARQ-ACK codebook by means of HARQ-ACK multiplexing. There are two HARQ-ACK codebooks in NR Rel-15:

The first codebook is the Semi-static HARQ-ACK codebook (also called Type 1 in TS38.213 Rel-15). The size of the semi-static HARQ-ACK codebook is determined based on the following four parameters: i) the configured number of TBs of one PDSCH; ii) the configured number of candidate PDSCH occasions in a time domain; iii) the configured number of carriers; and iv) the configured maximum number of CBGs per TB. The semi-static HARQ-ACK codebook determination is more robust against missed and false DCI detections than the dynamic HARQ-ACK codebook determination. However, this robustness comes at the expense of more ACK feedback bits.

The second codebook is the Dynamic HARQ-ACK codebook (also called Type 2 in TS38.213 Rel-15). The size of the Dynamic HARQ-ACK codebook is determined based on the number of actually received DL transmissions to be acknowledged in the same slot. In order to solve the problem of missed and false DCI detections, counter DAI and total DAI fields are specified in the DCI which schedules the PDSCH.

For Rel-16 NR access on the unlicensed spectrum (NR-U), a non-numerical value is added to the possible range of PDSCH-to-HARQ-timing-indicator values defined in Rel-15, and is used to indicate to the UE that the HARQ-ACK feedback for the corresponding PDSCH is postponed until the timing and resource for the HARQ-ACK feedback is provided by the gNB. This postponed HARQ-ACK feedback is indicated by the gNB when the corresponding PDSCH is transmitted at the end of the gNB-initiated COT and the gNB is unable to predict a suitable slot for the UE to transmit the HARQ-ACK feedback. One problem is how to trigger the transmission of the postponed HARQ-ACK feedback.

To solve this problem, one-shot HARQ-ACK feedback is proposed. The main intention is to use one DCI to trigger the HARQ-ACK feedback for all the configured downlink HARQ processes. Upon receiving the triggering DCI, the UE shall transmit the HARQ-ACK information bits for all HARQ processes in one HARQ-ACK codebook. In this way, not only the postponed HARQ-ACK feedback for PDSCHs in the earlier COT or current COT can be triggered for transmission, but also the previous HARQ-ACK feedback which are not transmitted due to LBT failure at UE side or not correctly received at gNB side due to burst interference can be triggered for retransmission. Basically, this one-shot triggering mechanism can be deemed as a fallback solution for both semi-static and the dynamic HARQ-ACK codebook determination. This mechanism is more applicable to the semi-static HARQ-ACK codebook since the pending HARQ-ACK feedback can be triggered for transmission. As for the dynamic HARQ-ACK codebook, the one-shot feedback mechanism may bring marginal gain.

However, one-shot HARQ-ACK feedback leads to a relatively large HARQ-ACK codebook, even much larger than the semi-static HARQ-ACK codebook. The determination of the size of the codebook is simple, for example, the typical number of DL HARQ processes is 16, thus the size of the one-shot HARQ-ACK codebook is 16 when the maximum number of codewords which can be scheduled by single DCI is 1, or 32 when the maximum number of codewords which can be scheduled by single DCI 2. Considering the CBG-based transmission and carrier aggregation, the one-shot HARQ-ACK codebook will be increased dramatically.

Figure 2:
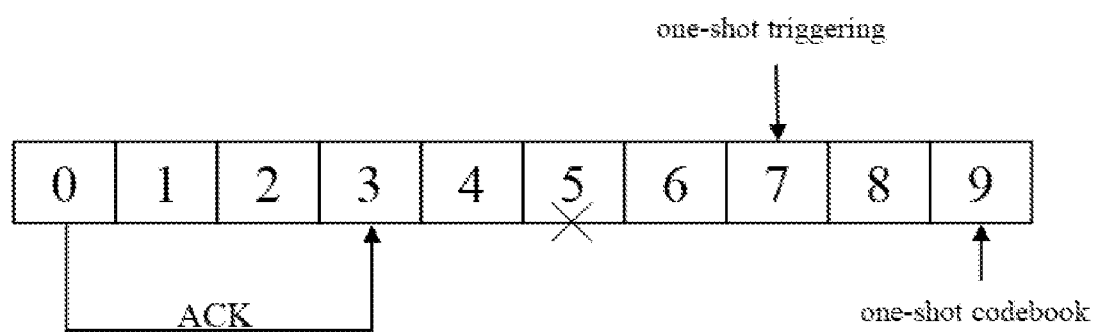
FIG. 2 illustrates one-shot HARQ-ACK feedback according to some embodiments of the subject disclosure.

Furthermore, for one-shot HARQ-ACK feedback, the misunderstanding between the gNB and the UE on the HARQ-ACK codebook may occur, when the UE already reports ACK for a given HARQ process but misses the new DL assignment for a given HARQ process. One example is shown in FIG. 2. In FIG. 2, the UE successfully decodes a PDSCH scheduled in slot 0 using HARQ process x, and the UE transmits the corresponding ACK for HARQ process x in slot 3. When the gNB transmits a new DL grant in slot 5 using the same HARQ process ID, x, for scheduling a new Transport Block (TB) and this DL grant is missed by the UE, upon reception of one-shot triggering DCI in slot 7, the UE shall retransmit the ACK for HARQ process x to the gNB. In slot 9, the UE transmits the one-shot codebook for the DL HARQ processes. However, the gNB assumes this ACK corresponds to the new TB scheduled by the DL grant in slot 5 and will not retransmit the new TB in following slots. Hence, the UE actually misses the DL transmission in slot 5.

Thus, from the perspective of the physical layer, the UE misses the new TB until a Radio Link Control (RLC) Automatic Repeat-reQuest (ARQ) is started. A similar issue also happens when the DCI for a given HARQ process is missed between two successive one-shot triggering DCIs.

In FIG. 2, only one TB is carried by one PDSCH and each TB is acknowledged with one-bit ACK or NACK. When multiple TBs are supported for one PDSCH or CBG-based retransmission is configured for PDSCH, each HARQ process will be acknowledged with C×M bits, wherein C is the maximum number of TBs supported for one PDSCH and M is the RRC configured maximum number of CBGs per TB. As a result, the one-shot HARQ-ACK codebook includes N×C×M bits, wherein N is the number of configured DL HARQ processes. Accordingly, the size of the one-shot HARQ-ACK codebook is huge and needs to be reduced.

In this disclosure, we focus on the one-shot HARQ-ACK codebook determination and provide several solutions to handle the misunderstanding between the gNB and the UE on missing DL transmissions, the huge size of the one-shot HARQ-ACK codebook, as well as some other issues.

In one preferred embodiment, the BS uses a dedicated DCI, which is not used for scheduling PDSCH or PUSCH, to trigger the one-shot HARQ-ACK feedback. Except the fields related to PUCCH transmission, other fields related to PDSCH or PUSCH transmission may be reused for transmitting the latest gNB-transmitted NDI bits. Upon receiving the triggering DCI, the UE shall transmit the HARQ-ACK feedback for all the configured DL HARQ processes.

FIG. 3 illustrates a DCI design according to some embodiments of the subject disclosure. As shown in the table in FIG. 3, the triggering DCI includes a newly added bit, a "Triggering Indicator", to indicate whether the one-shot HARQ-ACK feedback is triggered or not. If the value of this bit is set to "1", upon receiving this bit, the UE knows that one-shot HARQ-ACK feedback is triggered, and if the value of the bit is set to "0", the UE knows that one-shot HARQ-ACK feedback is not triggered, or vice versa.

If the triggering indicator indicates that the one-shot HARQ-ACK feedback is triggered, there are up to 16 bits in the triggering DCI, which are used to represent up to 16 latest gNB-transmitted NDI bits, each bit corresponding to one HARQ process. These 16 bits can reuse the fields which are not related to PUCCH transmission, e.g., time/frequency domain resource assignment, Modulation and Coding Scheme (MCS), New Data Indicator (NDI), Redundancy Version (RV), etc.

The fields of Transmit Power Control (TPC) command for scheduled PUCCH, PUCCH resource indicator and PUSCH-to-HARQ-feedback timing indicator, which are used for PUCCH transmission, are kept exclusively for indicating PUCCH transmission power, resource, and timing. In FIG. 3, the first 16 bits following the triggering indicator are reused up to a maximum of the 16 latest transmitted NDI bits for up to 16 HARQ processes. The location of these 16 bits could also be located in other places in the DCI except the locations of the fields used for PUCCH.

FIG. 4 illustrates another DCI design according to some embodiments of the subject disclosure. As shown in the table in FIG. 4, four fields—"Identifier," "Frequency domain resource assignment," "VRB-to-PRB mapping," and "Counter DAI"—are reserved as predetermined states as the triggering indicator. If these fields are all set to "0", then upon receiving the DCI where these four fields are set to "0", the UE knows that one-shot HARQ-ACK feedback is triggered, and if the values of these four fields are not all "0" s, the UE knows that one-shot HARQ-ACK feedback is not triggered. Alternatively, these fields may be set to other predefined values as the triggering indicator, for example, where they are all set to "1" to indicate that the one-shot HARQ-ACK feedback is triggered, or other values. Except when the fields in the DCI are related to PUCCH transmission, the other fields in the DCI may also be configured as the triggering indicator. For example, the fields "MCS", "NDI", "RV", etc., may also configured to be the reserved bits as the triggering indicator.

If the triggering indicator indicates that the one-shot HARQ-ACK feedback is triggered, there are up to 16 bits in the triggering DCI, which denote up to 16 latest gNB-transmitted NDI bits, wherein each bit corresponds to one HARQ process. In FIG. 4, the fields "Time domain resource assignment", "MCS", "NDI", "RV", and "HARQ process number", which are not related to PUCCH transmission, are reused as the 16 latest gNB-transmitted NDI bits. In particular, the field "Time domain resource assignment" is reused as the latest transmitted NDI bits for the $1^{st}$-$4^{th}$ HARQ processes, the field "MCS" is reused as the latest transmitted NDI bits for the $5^{th}$-$9^{th}$ HARQ processes; the field "NDI" is reused as the latest transmitted NDI bits for the $10^{th}$ HARQ processes; the field "RV" is reused as the latest transmitted NDI bits for the $11^{th}$-$12^{th}$ HARQ processes; and the field "HARQ process number" is reused as the latest transmitted NDI bits for the $13^{th}$-$16^{th}$ HARQ processes.

In this embodiment, the fields of TPC command for scheduled PUCCH, PUCCH resource indicator and PUSCH-to-HARQ-feedback timing indicator, which are used for PUCCH transmission, are also kept exclusively for indicating PUCCH transmission power, resource, and timing.

FIG. 5 illustrates yet another DCI design according to some embodiments of the subject disclosure. In this embodiment, a specific Radio Network Temporary Identity (RNTI) is specified for the triggering DCI. If the Cyclic Redundancy Check (CRC) bits of the DCI are scrambled by the RNTI, this indicates that the one-shot HARQ-ACK feedback is triggered. If the UE detects such DCI, it knows the DCI is used to trigger one-shot feedback.

There are up to 16 bits in the DCI, which correspond to up to the 16 latest gNB-transmitted NDI bits, wherein each bit corresponds to one HARQ process. These 16 bits can reuse the fields which are not related to PUCCH transmission, e.g., time/frequency domain resource assignment, MCS, NDI, RV, etc. The fields of TPC, PUCCH resource indicator and HARQ-feedback timing indicator are kept exclusively for indicating PUCCH transmission power, resource, and timing.

In FIG. 5, the first 16 bits in the DCI are reused up to a maximum of the 16 latest transmitted NDI bits with each bit for each HARQ process. The location of these 16 bits could also be located in other places in the DCI except the fields used for PUCCH, the subject disclosure has no intention of limiting the location of the 16 bits except for the fields used for PUCCH.

In the three embodiments as shown in FIGS. 3, 4, and 5, the DCI can reuse the DCI format for scheduling PDSCH or PUSCH, e.g., DCI format 0_0, DCI format 0_1, DCI format 1_0, DCI format 1_1 or a new DCI format specified for NR-U. If the format of the DCI is reused as the triggering DCI, the field of the PDSCH-to-HARQ_feedback timing indicator is reinterpreted as the timing offset in the slot level from the ending of the triggering DCI to the beginning of the PUCCH transmission.

Figure 6:
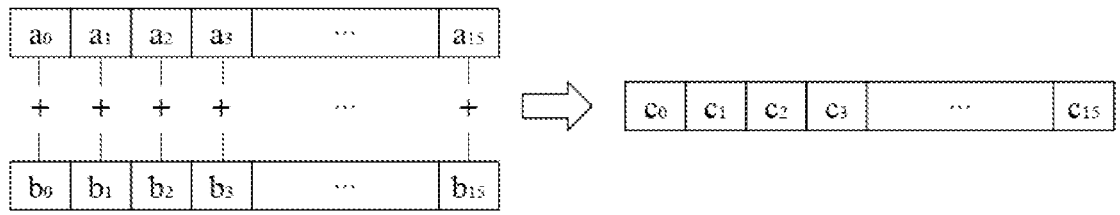
FIG. 6 illustrates an embodiment of determining the one-shot HARQ-ACK codebook performed by the UE according to some embodiments of the subject disclosure.

FIG. 6 illustrates an embodiment of determining the one-shot HARQ-ACK codebook performed by the UE according to some embodiments of the subject disclosure. In this embodiment, the triggering DCI does not include the latest transmitted NDI bits, and the UE generates the one-shot HARQ-ACK codebook by performing bit level addition for each HARQ process.

The bit level addition is shown in FIG. 6. In FIG. 6, there are 16 HARQ processes, numbered as 0, 1, 2, . . . , 15. The HARQ process number may also be numbered as 1, 2, . . . , 16, or other numbers. Assuming the HARQ-ACK information bits for the 16 HARQ process are $a_0$, $a_1$, $a_2$, . . . , $a_{15}$, respectively, and the latest NDI bit received by the UE for these processes are $b_0$, $b_1$, $b_2$, . . . , $b_{15}$, respectively, the bit level addition is performed as follows:

$$c_0 = a_0 + b_0,$$
$$c_1 = a_1 + b_1,$$
$$c_2 = a_2 + b_2, .$$
$$...$$
$$c_{15} = a_{15} + b_{15}$$

Alternatively, the UE may perform bit level subtraction, which is performed as follows:

$$c_0 = a_0 - b_0,$$
$$c_1 = a_1 - b_1,$$
$$c_2 = a_2 - b_2, .$$
$$...$$
$$c_{15} = a_{15} - b_{15}$$

The UE then reports $c_0$, $c_1$, $c_2$, . . . , $c_{15}$ in the one-shot HARQ-ACK codebook.

At the gNB side, upon reception of the one-shot HARQ-ACK codebook, if the UE performs the bit level addition, the gNB also performs bit level addition for each HARQ process by adding the latest transmitted NDI bit to the received bit in the one-shot HARQ-ACK codebook. For example, FIG. 7 illustrates an embodiment of determining the one-shot HARQ-ACK codebook performed by the BS according to some embodiments of the subject disclosure.

Figure 7:
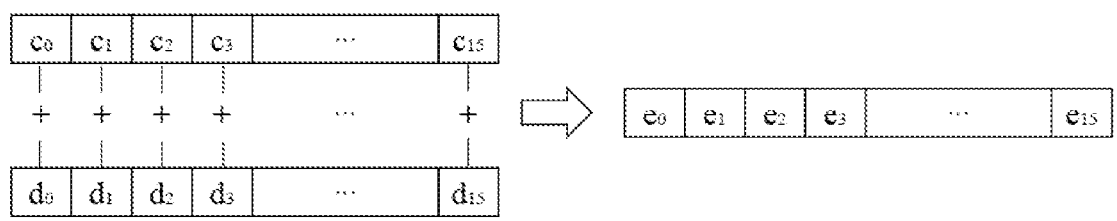
FIG. 7 illustrates an embodiment of determining the one-shot HARQ-ACK codebook performed by the BS according to some embodiments of the subject disclosure.

In FIG. 7, there are 16 HARQ processes also numbered as 0, 1, 2, . . . , 15. As depicted in FIG. 6, the one-shot HARQ-ACK codebook includes $c_0$, $c_1$, $c_2$, . . . , $c_{15}$. Assuming the latest gNB-transmitted NDI bit for the HARQ processes 0, 1, 2, . . . , 15 is $d_0$, $d_1$, $d_2$, . . . , $d_{15}$, the bit level addition is performed by the gNB as follows:

$$e_0 = c_0 + d_0,$$
$$e_1 = c_1 + d_1,$$
$$e_2 = c_2 + d_2, .$$
$$...$$
$$e_{15} = c_{15} + d_{15}$$

In view of the determination of the bits in the one-shot HARQ-ACK codebook, the values of $e_1$, $e_1$, $e_2$, . . . , $e_{15}$ are calculated as below:

$$e_0 = c_0 + d_0 = a_0 + b_0 + d_0,$$
$$e_1 = c_1 + d_1 = a_1 + b_1 + d_1,$$
$$e_2 = c_2 + d_2 = a_2 + b_2 + d_2, .$$
$$...$$
$$e_{15} = c_{15} + d_{15} = a_{15} + b_{15} + d_{15}$$

Alternatively, if the UE performs bit level subtraction, correspondingly, the gNB also performs bit level subtraction, which is performed as follows:

$$e_0 = c_0 - d_0 = a_0 - b_0 - d_0,$$
$$e_1 = c_1 - d_1 = a_1 - b_1 - d_1,$$
$$e_2 = c_2 - d_2 = a_2 - b_2 - d_2, .$$
$$...$$
$$e_{15} = c_{15} - d_{15} = a_{15} - b_{15} - d_{15}$$

The gNB then considers that the values of $e_0$, $e_1$, $e_2$, . . . , $e_{15}$ as the HARQ-ACK information bit for the DL HARQ processes 0, 1, 2, . . . , 15 respectively. If $e_x$ is "0", it corresponds to NACK, then gNB assumes the UE has not successfully decoded the HARQ process x; if $e_x$ is "1", it corresponds to ACK, then the gNB assumes the UE has successfully decoded the HARQ process x. It is noted that other bit level operation, e.g., bit level multiplication, AND, OR, XOR, XNOR, are also included in this disclosure.

Based on the above method, the misunderstanding between a gNB and a UE is handled. Consider the three different cases as follows:

Case 1: for a given HARQ process x, if there is not any missing DL transmission for HARQ process x, the latest UE-received NDI should be equal to the latest gNB-transmitted NDI, i.e., $b_x = d_x$, so $b_x + d_x = 0$ in modulo 2 addition. After performing bit level addition by the gNB, $e_x = a_x + b_x + d_x = a_x$. Therefore, the HARQ-ACK information bit for HARQ process x is correctly transmitted from the UE to the gNB.

Case 2: for a given HARQ process x, if the UE reports an Acknowledgement (ACK) but misses the new DCI from the gNB scheduling a new TB with the NDI toggled. ACK means a TB is correctly received, and is represented using the value "1", and NACK means a TB is erroneously received, and is represented using the value "0". Due to the new DCI is missed, UE retransmits the ACK for HARQ process x. So the parameter $a_x = 1$, and the parameter $\overline{b_x} = d_x$ due to NDI toggled, where the operation of $\overline{b_x}$ is "NOT" operation of bit "$b_x$". If the value of $b_x$ is 1, then the value of $\overline{b_x}$ is 0. Similarly, if the value of $b_x$ is 0, then the value of $\overline{b_x}$ is 1.

In the one-shot HARQ-ACK codebook, the UE transmits $a_x + b_x$ for HARQ process x, because the UE assumes the previous HARQ-ACK information bit $a_x$ is the latest generated HARQ-ACK information bit and the previous NDI bit $b_x$ is its latest received NDI bit.

At the gNB side, the latest transmitted NDI bit $d_x$ is toggled for scheduling a new TB transmission, i.e., $\overline{b_x} = d_x$, $b_x + d_x = 1$. Then after performing bit level addition with the latest transmitted NDI, $a_x + b_x + d_x = a_x + 1 = \overline{a_x}$. Since the value of $a_x$ is 1, then the value of $\overline{a_x}$ is 0, which means a TB is erroneously received. Therefore, the ACK for HARQ process x is changed to NACK after transmission from the UE to the gNB. Under this condition, for HARQ process x, the UE assumes the "ACK" is retransmitted while the gNB understands this "ACK" to "NACK", which corresponds to the missed new TB transmission. Upon reception of this "NACK", the gNB would retransmit the missed new TB.

Although the gNB and the UE interpret the HARQ-ACK information bit differently, a new TB missed by the UE is retransmitted. The misunderstanding is handled.

Case 3: for the given HARQ process x, if the UE reports NACK, i.e., $a_x = 0$, and misses the DCI scheduling retransmission with the NDI non-toggled, then in the one-shot HARQ-ACK codebook, the UE transmits $a_x + b_x$ for HARQ process x, because the UE assumes previous HARQ-ACK information bit $a_x$ is the latest generated HARQ-ACK information bit and the previous NDI bit $b_x$ is its latest received NDI bit.

At the gNB side, the latest transmitted NDI bit $d_x$ is not toggled for scheduling retransmission, i.e., $b_x=d_x$, $b_x+d_x=0$ in modulo 2 addition. After performing bit level addition with the latest transmitted NDI, $a_x+b_x+d_x=a_x+0=a_x$. Thus, the NACK for HARQ process x is still NACK after transmission from the UE to the gNB. Although the UE assumes the "NACK" is retransmitted, the gNB assumes this "NACK" is corresponding to the missed retransmission. Upon reception of this "NACK", the gNB would retransmit the missed retransmission.

Although the gNB and the UE interpret the "NACK" differently, the missed retransmission is still to be retransmitted. The misunderstanding is handled.

If the CBG-based retransmission is configured, for each HARQ process in the one-shot codebook, the CBG-based HARQ-ACK information bits for one TB is added to the same NDI bit of the TB.

Figure 8:
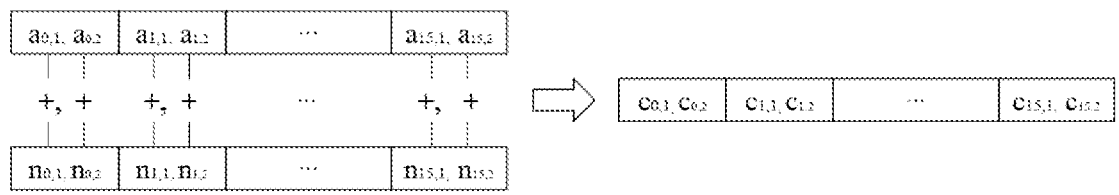
FIG. 8 illustrates another embodiment of determining the one-shot HARQ-ACK codebook performed by the UE according to some embodiments of the subject disclosure.

FIG. 8 illustrates another embodiment of determining the one-shot HARQ-ACK codebook performed by the UE according to some embodiments of the subject disclosure. In this embodiment, the maximum number of codewords which can be scheduled by a single DCI is configured to 2 and spatial bundling is not configured. Correspondingly, for each HARQ process, there are two corresponding HARQ-ACK information bits. For example, HARQ process 1 has two HARQ-ACK information bits, $a_{1,1}$ and $a_{1,2}$. Each codeword has its own NDI bit in the DCI, suppose the $n_{1,1}$ and $n_{1,2}$ are the two NDI bits for the two codewords of HARQ process 1, the HARQ-ACK feedback has two bits, $c_{1,1}$, and $c_{1,2}$, which are generated by performing modulo 2 addition between $a_{1,1}$ and $n_{1,1}$, $a_{1,2}$ and $n_{1,2}$ respectively. In other words, $c_{1,1}=a_{1,1}+n_{1,1}$, and $c_{1,2}=a_{1,2}+n_{1,2}$. For the other HARQ processes, the HARQ information bits are generated in a similar fashion.

In the final one-shot codebook, the two HARQ information bits for each HARQ process are added to the respective NDI bit. As shown in FIG. 8 which includes 16 HARQ processes, numbered as 0, 1, . . . , 15, the final one-shot codebook includes $c_{0,1}$, $c_{0,2}$, $c_{1,1}$, $c_{1,2}$, . . . $c_{15,1}$, $c_{15,2}$.

For a HARQ process, if only one codeword is scheduled by the DCI, then the HARQ-ACK information bit for this codeword is placed firstly then followed by a NACK bit. In the final one-shot HARQ-ACK codebook, for this HARQ process, the first HARQ-ACK bit is added to its NDI bit and the "NACK" bit is added as bit "0". For example, if the DCI only schedules the first codeword for HARQ process 1, the value of HARQ-ACK information bit $a_{1,2}$ is set to "NACK" and is placed after the HARQ-ACK information bit $a_{1,1}$.

In another embodiment, the gNB could neglect the bit position corresponding to the non-scheduled codeword in the one-shot HARQ-ACK codebook.

Figure 9:
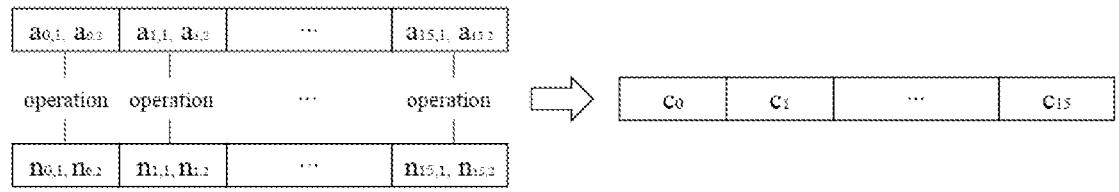
FIG. 9 illustrates yet another embodiment of determining the one-shot HARQ-ACK codebook performed by the UE according to some embodiments of the subject disclosure.

FIG. 9 illustrates yet another embodiment of determining the one-shot HARQ-ACK codebook performed by the UE according to some embodiments of the subject disclosure. In this embodiment, the maximum number of codewords which can be scheduled by a single DCI is configured to 2 and spatial bundling is configured. For each HARQ process, there is only one HARQ-ACK feedback bit in the HARQ-ACK codebook. For example, in FIG. 9, HARQ process 1 has two HARQ-ACK information bits, $a_{1,1}$ and $a_{1,2}$. Each codeword has its own NDI bit in the DCI, suppose the $n_{1,1}$ and $n_{1,2}$ are the two NDI bits for the two codewords of HARQ process 1, the final bit for HARQ process 1 is $c_1$. In this disclosure, several options for generating the final bits are proposed.

In the 1$^{st}$ option, spatial bundling is performed between the two HARQ-ACK information bits, then added to the first NDI bit in the DCI (i.e., the NDI bit for the first codeword). Thus, $c_1=(a_{1,1}$ AND $a_{1,2})+n_{1,1}$, where the AND operation is the Boolean AND operation. Only when both the values of $a_{1,1}$ and $a_{1,2}$ are "1", the output of the AND operation is "1", if any values of $a_{1,1}$ and $a_{1,2}$ are "0", the output of the AND operation is "0".

In the 2$^{nd}$ option, spatial bundling is performed between the two HARQ-ACK information bits, then added to the second NDI bit in the DCI (i.e., the NDI bit for the second codeword). Thus, $c_1=(au$ AND $a_{1,2})+n_{1,2}$.

In the 3$^{rd}$ option, spatial bundling is performed between the two HARQ-ACK information bits, then added to the two NDI bits. Thus, $c_1=(a_{1,1}$ AND $a_{1,2})+n_{1,1}+n_{1,2}$.

In the 4$^{th}$ option, spatial bundling is performed between the two HARQ-ACK information bits, then added to the bundling of the two NDI bits. Thus, $c_1=(a_{1,1}$ AND $a_{1,2})+(n_{1,1}$ AND $n_{1,2})$.

In the 5$^{th}$ option, each HARQ-ACK information bit is added to the respective NDI then bundling between the two bits is performed. Thus, $c_1=(a_{1,1}+n_{1,1})+(a_{1,2}+n_{1,2})$.

In the 6$^{th}$ option, two HARQ-ACK information bits are bundled, the two NDI bits are also bundled, then two bundled bits are added in modulo 2 addition. Thus, $c_1=(a_{1,1}$ AND $a_{1,2})+(n_{1,1}$ AND $n_{1,2})$. Other bit level operations, e.g., bit level addition, subtraction, multiplication, AND, OR, XOR, XNOR, among the two HARQ information bits and two NDI bits for the same HARQ process are also included.

For the SPS PDSCH, there is no NDI bit. So in the one-shot HARQ-ACK codebook, the HARQ-ACK information bit for the SPS PDSCH is added as a fake NDI bit, which has the value of "0", or does not perform the operation. For a given HARQ process, the SPS PDSCH is transmitted and acknowledged with ACK, then DCI scheduling a new TB with the same HARQ process should use an NDI bit of "1".

For DL SPS transmission, a DCI is used to release the DL SPS transmission and one HARQ-ACK information bit is transmitted to confirm that the UE successfully received the DCI. Since no HARQ process is indicated in this DCI, in the one-shot HARQ-ACK codebook, besides the HARQ-ACK feedback for all configured DL HARQ processes, an additional bit for DCI indicating the DL SPS release is also included.

In one embodiment, the HARQ-ACK information bit for DCI indicating DL SPS release is placed following the HARQ-ACK information bits for the DL HARQ processes. Alternatively, the HARQ-ACK information bit for DCI indicating the DL SPS release is placed at the beginning of the one-shot HARQ-ACK codebook. Since no NDI is indicated in this DCI, in one embodiment, the HARQ-ACK information bit for DCI indicating the DL SPS release is directly and included in the one-shot HARQ-ACK codebook without the bit level addition with NDI; or, the HARQ-ACK information bit for DCI indicating the DL SPS release is included in the one-shot codebook with bit level addition as a fake NDI bit of "0".

In this way, same understanding on one-shot HARQ-ACK codebook between the gNB and the UE is guaranteed.

Figure 10:
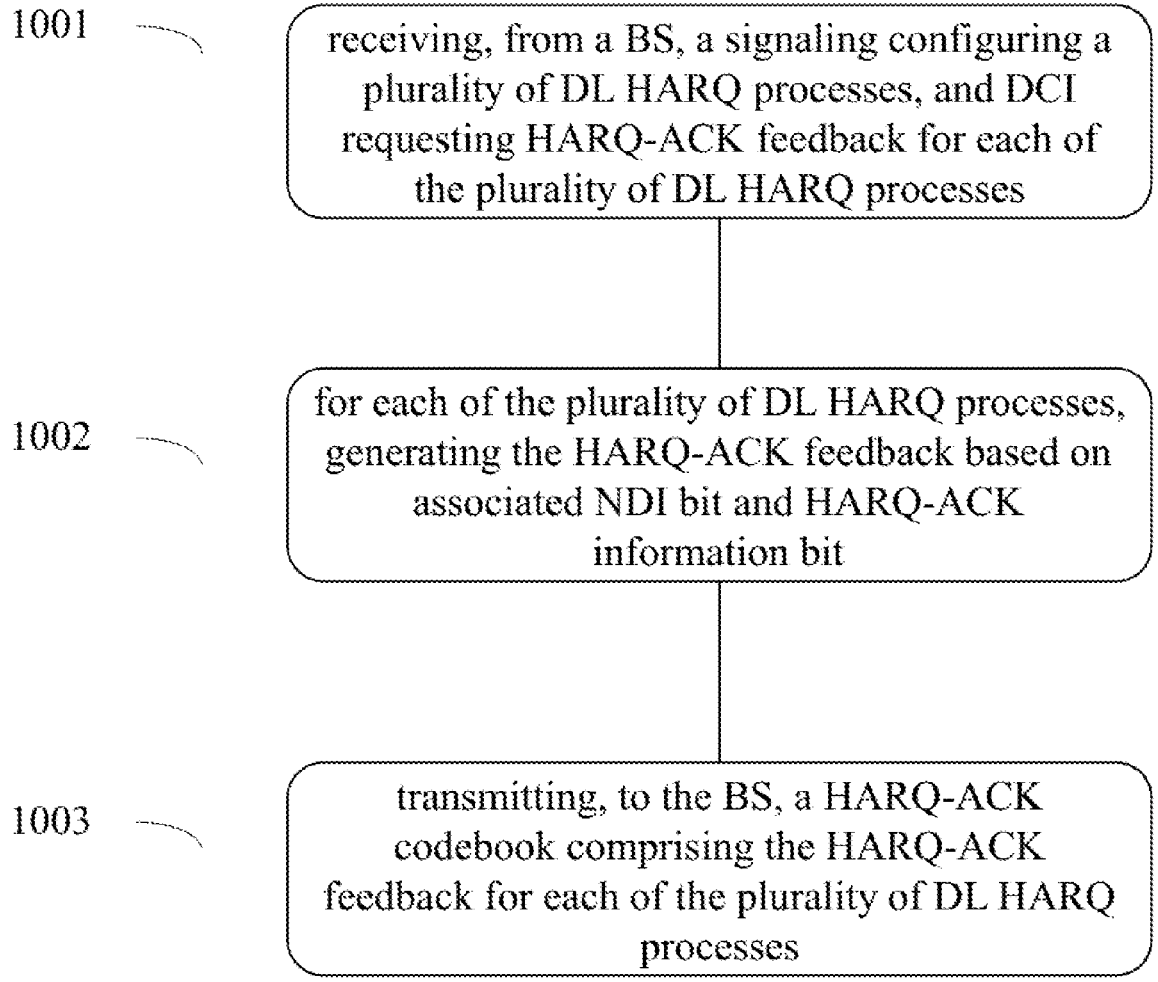
FIG. 10 illustrates a method performed by a UE for wireless communication according to some embodiments of the subject disclosure.

FIG. 10 illustrates a method performed by a UE for wireless communication according to a preferred embodiment of the subject disclosure. In step 1001, the UE (e.g., UE 101 as shown in FIG. 1) receives, from a base station (BS), a signaling configuring a plurality of DL HARQ processes, and DCI requesting HARQ-ACK feedback for each of the plurality of DL HARQ processes. In step 1002, for each of the plurality of DL HARQ processes, the UE generates the HARQ-ACK feedback based on associated NDI bit and HARQ-ACK information bit. In step 1003, the UE transmits, to the BS, a HARQ-ACK codebook including the HARQ-ACK feedback for each of the plurality of DL HARQ processes.

In one embodiment, the DCI includes a dedicated indicator for requesting the HARQ-ACK feedback, for example, the first field "Triggering indicator" in FIG. 3. Alternatively, the DCI includes a number of predetermined fields, for example, in FIG. 4, four fields "Identifier," "Frequency domain resource assignment," "VRB-to-PRB mapping," and "Counter DAI" are reserved to predetermined states as the triggering indicator, which are set to predefined states for requesting the HARQ-ACK feedback. Or, in FIG. 5, the CRC bits of the DCI are scrambled by a specific Radio Network Temporary Identity (RNTI) for requesting the HARQ-ACK feedback.

For each DL HARQ process, if the latest NDI bit transmitted by the BS is different to the latest NDI bit received by the UE, the UE generates a NACK bit as the HARQ-ACK feedback. The latest NDI bit transmitted by the BS associated with each of the plurality of DL HARQ processes is included in the DCI. The DCI also includes a number of predetermined fields for indicating the latest NDI bit associated with each of the plurality of DL HARQ processes, for example, in FIG. 4, the fields "Time domain resource assignment", "MCS", "NDI", "RV", and "HARQ process number", are reused for indicating the 16 latest gNB-transmitted NDI bits.

For each DL HARQ process, if the DL HARQ process is correctly decoded, the HARQ-ACK information bit is set to an ACK, with the value of "1", else if the DL HARQ process is not correctly decoded, the HARQ-ACK information bit is set to an NACK, with the value of "0".

In one preferred embodiment, for each DL HARQ process, the HARQ-ACK feedback is generated by performing modulo 2 addition between corresponding HARQ-ACK information bit and the latest NDI bit received by the UE, for example, in FIG. 6, the HARQ-ACK feedback for the DL HARQ process 1, $c_1$, is generated by performing modulo 2 between corresponding HARQ-ACK information bit $a_1$ and the latest NDI bit $b_1$.

In another embodiment, if each DL HARQ process can carry two TBs, the UE would generate two HARQ-ACK information bits for each DL HARQ process, each HARQ-ACK information bit corresponds to one TB. For example, in FIG. 8, the UE generates two HARQ-ACK information bits for HARQ process 1, which are $a_{1,1}$ and $a_{1,2}$. When spatial bundling is not configured, if one TB is scheduled, and the other is not scheduled, the HARQ-ACK information bit for scheduled TB is placed firstly then followed by NACK bit for the non-scheduled. The NDI bit for the non-scheduled TB is "0".

For each DL HARQ process, if maximum two TBs can be carried by each DL HARQ process and spatial bundling is not configured, the HARQ-ACK feedback has two bits, for example, the two bits $c_{1,1}$ and $c_{1,2}$ in FIG. 8, are generated by performing modulo 2 addition between the respective HARQ-ACK information bit $a_{1,1}$ and $a_{1,2}$ and the corresponding latest NDI bit $n_{1,1}$ and $n_{1,2}$.

If maximum two TBs can be carried by each of the plurality of DL HARQ processes and spatial bundling is configured, for each DL HARQ process, the HARQ-ACK feedback is generated based on a predefined bit level operation among the HARQ-ACK information bits and the latest received NDI bits. For example, in FIG. 9, the HARQ-ACK feedback for HARQ process 1, $c_1$, is generated based on an operation among the HARQ-ACK information bits $a_{1,1}$ and $a_{1,2}$ and the NDI bits $n_{1,1}$ and $n_{1,2}$.

For the SPS PDSCH, there is no the NDI bit, therefore, the NDI bit is set to "0".

The HARQ-ACK codebook also includes an additional HARQ-ACK information bit for DCI indicating DL SPS release. The location of the additional HARQ-ACK information bit is predetermined, it may be at the beginning of the one-shot HARQ-ACK codebook, or at the end of the one-shot HARQ-ACK codebook.

If CBG-based retransmission is configured, then all CBG level HARQ-ACK information bits for a TB correspond to same NDI bit associated with the TB.

In the HARQ-ACK codebook, the HARQ-ACK feedback for each DL HARQ process is concatenated in the order of DL HARQ process number, for example, in FIG. 6, the bits $c_0, c_1, c_2, \ldots, c_{15}$ are concatenated in the order of DL HARQ process number.

The DCI requesting HARQ-ACK feedback for each DL HARQ process has a same format as the DCI scheduling PDSCH or Physical Uplink Shared Channel (PUSCH) transmission. For example, The DCI can reuse the DCI format for scheduling PDSCH or PUSCH, e.g., DCI format 0_0, DCI format 0_1, DCI format 1_0, DCI format 1_1 or a new DCI format specified for NR-U.

Figure 11:
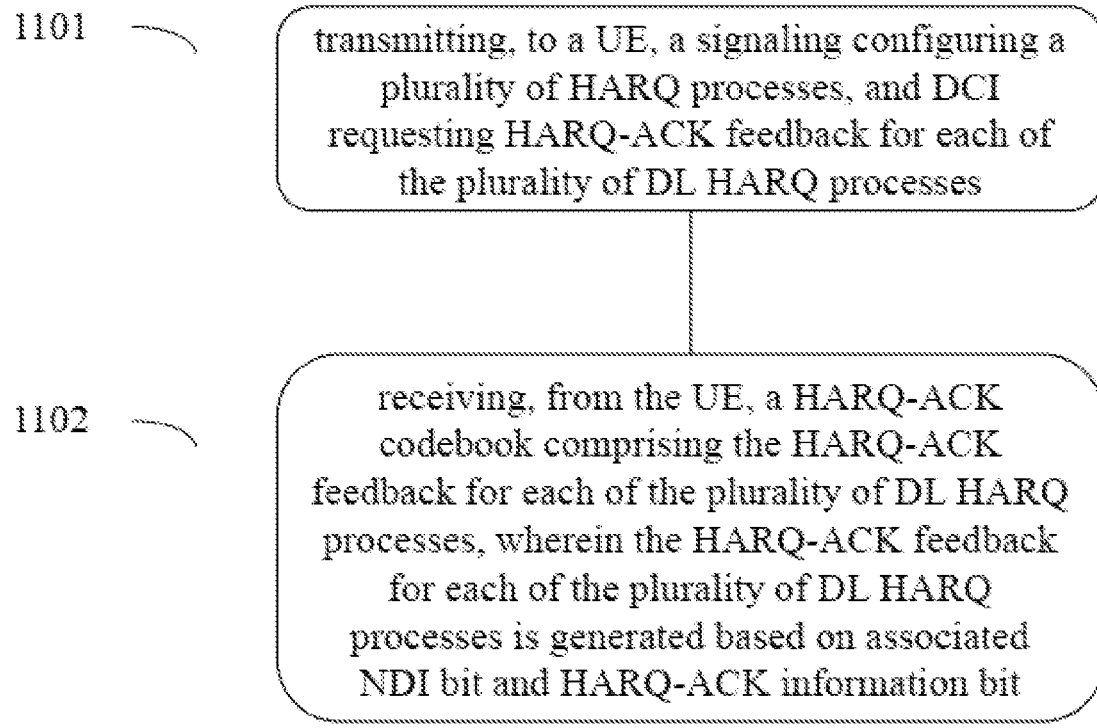
FIG. 11 illustrates a method performed by a BS for wireless communication according to some embodiments of the subject disclosure.

FIG. 11 illustrates a method performed by a BS for wireless communication according to a preferred embodiment of the subject disclosure. In step 1101, the BS (e.g., BS 102 as shown in FIG. 1) transmits, to a UE, a signaling configuring a plurality of DL HARQ processes, and DCI requesting HARQ-ACK feedback for each of the plurality of DL HARQ processes; In step 1102, the BS receiving, from the UE, a HARQ-ACK codebook including the HARQ-ACK feedback for each of the plurality of DL HARQ processes, wherein the HARQ-ACK feedback for each of the plurality of DL HARQ processes is generated based on associated NDI bit and HARQ-ACK information bit.

In one embodiment, the DCI includes a dedicated indicator for requesting the HARQ-ACK feedback, for example, the first field "Triggering indicator" in FIG. 3. Alternatively, the DCI includes a number of predetermined fields, for example, in FIG. 4, four fields "Identifier," "Frequency domain resource assignment," "VRB-to-PRB mapping," and "Counter DAP" are reserved to predetermined states as the triggering indicator, which are set to predefined states for requesting the HARQ-ACK feedback. Or, in FIG. 5, the CRC bits of the DCI are scrambled by a specific Radio Network Temporary Identity (RNTI) for requesting the HARQ-ACK feedback.

For each DL HARQ process, if the latest NDI bit transmitted by the BS being different to the latest NDI bit received by the UE, then a NACK bit is generated as the HARQ-ACK feedback. The latest NDI bit transmitted by the BS associated with each of the plurality of DL HARQ processes is included in the DCI. The DCI also includes a number of predetermined fields for indicating the latest NDI bit associated with each of the plurality of DL HARQ processes, for example, in FIG. 4, the fields "Time domain resource assignment", "MCS", "NDI", "RV", and "HARQ process number", are reused for indicating the 16 latest gNB-transmitted NDI bits.

For each DL HARQ process, if the DL HARQ process is correctly decoded, the HARQ-ACK information bit is set to an ACK, with the value of "1", else if the DL HARQ process is not correctly decoded, the HARQ-ACK information bit is set to an NACK, with the value of "0".

In one preferred embodiment, for each DL HARQ process, the HARQ-ACK feedback is generated by performing modulo 2 addition between corresponding HARQ-ACK information bit and the latest NDI bit received by the UE, for example, in FIG. 6, the HARQ-ACK feedback for the DL HARQ process 1, $c_1$, is generated by performing modulo 2 between corresponding HARQ-ACK information bit $a_1$ and the latest NDI bit $b_1$. At the gNB side, after receiving the plurality of DL HARQ processes, for each of the plurality of DL HARQ processes, the gNB performs modulo 2 addition between the received HARQ-ACK feedback and the latest NDI bit transmitted by the gNB to retrieve the HARQ-ACK information bit. For example, as shown in FIG. 7, the retrieved HARQ-ACK feedback for the DL HARQ process 1, $e_1$, is generated by performing modulo 2 addition between received HARQ-ACK feedback $c_1$ and the latest gNB-transmitted NDI bit $d_1$.

In another embodiment, if each DL HARQ process can carry two TBs, the UE would generate two HARQ-ACK information bits for each DL HARQ process, each HARQ-ACK information bit corresponds to one TB. For example, in FIG. 8, the UE generates two HARQ-ACK information bits for HARQ process 1, which are $a_{1,1}$ and $a_{1,2}$. When spatial bundling is not configured, if one TB is scheduled, and the other is not scheduled, the HARQ-ACK information bit for scheduled TB is placed firstly then followed by NACK bit for the non-scheduled. The NDI bit for the non-scheduled TB is "0".

For each DL HARQ process, if maximum two TBs can be carried by each DL HARQ process and spatial bundling is not configured, the HARQ-ACK feedback has two bits, for example, the two bits $c_{1,1}$ and $c_{1,2}$ in FIG. 8, are generated by performing modulo 2 addition between the respective HARQ-ACK information bit $a_{1,1}$ and $a_{1,2}$ and the corresponding latest NDI bit $n_{1,1}$ and $n_{1,2}$. At the gNB side, after receiving the HARQ-ACK feedback, the gNB performs modulo 2 addition between each bit of the HARQ-ACK feedback and the corresponding latest NDI bit transmitted by the gNB to retrieve the HARQ-ACK information bit for each DL HARQ process. For example, as shown in FIG. 8, for HARQ process 1, the gNB performs modulo 2 addition between $c_{1,1}$ and $d_{1,1}$, $c_{1,2}$ and $d_{1,2}$ respectively, where du and $d_{1,2}$ are the latest NDI bit transmitted by the gNB for each TB of HARQ process 1.

If maximum two TBs can be carried by each of the plurality of DL HARQ processes and spatial bundling is configured, for each DL HARQ process, the HARQ-ACK feedback is generated based on a first predefined bit level operation among the HARQ-ACK information bits and the latest received NDI bits. For example, in FIG. 9, the HARQ-ACK feedback for HARQ process 1, $c_1$, is generated based on an operation among the HARQ-ACK information bits $a_{1,1}$ and $a_{1,2}$ and the NDI bits $n_{1,1}$ and $n_{1,2}$. At the gNB side, after receiving the HARQ-ACK feedback, the gNB performing a second predefined bit level operation among the HARQ-ACK feedback and the corresponding latest NDI bits transmitted by the gNB to retrieve the HARQ-ACK information bit. For example, as shown in FIG. 9, for HARQ process 1, the UE performs predefined bit level operations on $a_{1,1}$, $a_{1,2}$, $n_{1,1}$, and $n_{1,2}$, to obtain one bit and the gNB performs the second predefined bit level operation to retrieve the HARQ-ACK information bit. The second predefined bit level operation is inverse operation to the first predefined bit level operation using the latest gNB-transmitted NDI bit.

For the SPS PDSCH, there is no the NDI bit, therefore, the NDI bit is set to "0".

The HARQ-ACK codebook also includes an additional HARQ-ACK information bit for DCI indicating DL SPS release. The location of the additional HARQ-ACK information bit is predetermined, it may be at the beginning of the one-shot HARQ-ACK codebook, or at the end of the one-shot HARQ-ACK codebook.

If CBG-based retransmission is configured, then all CBG level HARQ-ACK information bits for a TB correspond to same NDI bit associated with the TB.

In the HARQ-ACK codebook, the HARQ-ACK feedback for each DL HARQ process is concatenated in the order of DL HARQ process number, for example, in FIG. 6, the bits $c_0, c_1, c_2, \ldots, c_{15}$ are concatenated in the order of DL HARQ process number.

The DCI requesting HARQ-ACK feedback for each DL HARQ process has a same format as the DCI scheduling PDSCH or Physical Uplink Shared Channel (PUSCH) transmission. For example, The DCI can reuse the DCI format for scheduling PDSCH or PUSCH, e.g., DCI format 0_0, DCI format 0_1, DCI format 1_0, DCI format 1_1 or a new DCI format specified for NR-U.

Figure 12:
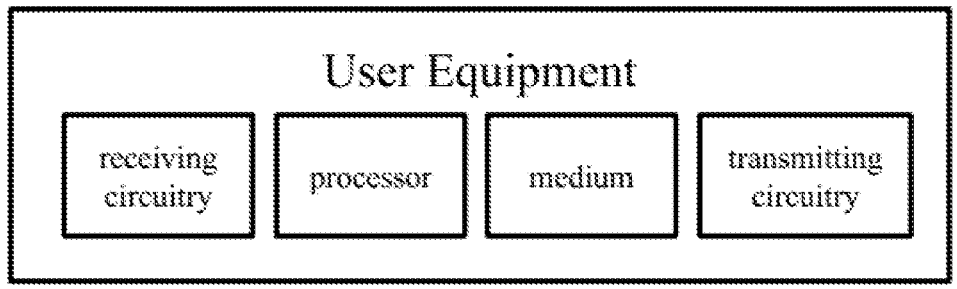
FIG. 12 illustrates a block diagram of a UE according to some embodiments of the subject disclosure.
Figure 13:
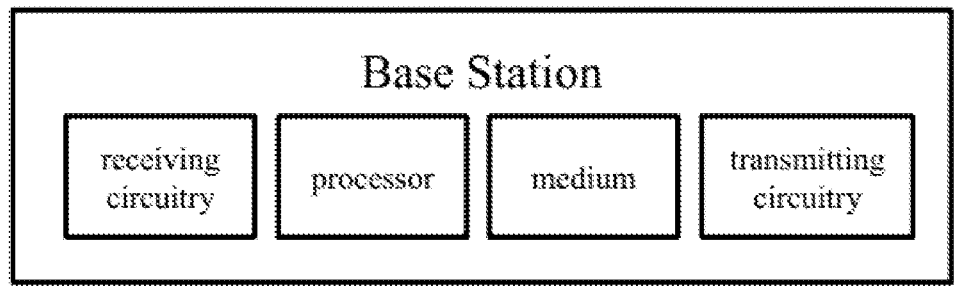
FIG. 13 illustrates a block diagram of a BS according to some embodiments of the subject disclosure.

FIG. 12 illustrates a block diagram of a UE according to the embodiments of the subject disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 10) with the receiving circuitry, the transmitting circuitry and the processor. That is, the receiving circuitry may receive, a signaling configuring a plurality of DL HARQ processes, and DCI requesting HARQ-ACK feedback for each of the plurality of DL HARQ processes, the processor then generates the HARQ-ACK feedback based on associated NDI bit and HARQ-ACK information bit for each of the plurality of DL HARQ processes, and the transmitting circuitry may transmit, to the BS, a HARQ-ACK codebook comprising the HARQ-ACK feedback for each of the plurality of DL HARQ processes FIG. 13 illustrates a block diagram of a BS according to the embodiments of the subject disclosure. The BS 102 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 11) with the receiving circuitry, the transmitting circuitry and the processor. That is, the transmitting circuitry transmits, to a UE, a signaling configuring a plurality of DL HARQ processes, and DCI requesting HARQ-ACK feedback for each of the plurality of DL HARQ processes; and the receiving circuitry receives from the UE, a HARQ-ACK codebook comprising the HARQ-ACK feedback for each of the plurality of DL HARQ processes, wherein the HARQ-ACK feedback for each of the plurality of DL HARQ processes is generated based on associated NDI bit and HARQ-ACK information bit.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
   receiving, from a base station (BS), a signaling configuring a plurality of downlink (DL) hybrid automatic repeat request (HARQ) processes, and downlink control information (DCI) requesting feedback for each DL HARQ process of the plurality of DL HARQ processes;
   generating, for each DL HARQ process of the plurality of DL HARQ processes, two information bits based on a maximum number of transport blocks (TBs) that can be carried by each DL HARQ process of the plurality of DL HARQ processes being two and spatial bundling not being configured, wherein the two information bits comprise a HARQ-acknowledge (ACK) information bit associated with a scheduled TB and a HARQ-negative ACK (NACK) information bit associated with a non-scheduled TB;
   for each DL HARQ process of the plurality of DL HARQ processes, generating the feedback based on an associated new data indicator (NDI) bit and the two information bits, wherein the HARQ-ACK information bit is before the HARQ-NACK information bit in the feedback; and
   transmitting, to the BS, a codebook including the feedback for each DL HARQ process of the plurality of DL HARQ processes, wherein the feedback for each DL HARQ process of the plurality of DL HARQ processes is concatenated in the codebook in an order of DL HARQ process number.

2. The method of claim 1, wherein the DCI includes an indicator for requesting the feedback.

3. The method of claim 1, wherein cyclic redundancy check (CRC) bits of the DCI are scrambled by a specific radio network temporary identifier (RNTI) for requesting the feedback.

4. The method of claim 1, further comprising:
   for each DL HARQ process of the plurality of DL HARQ processes, generating the HARQ-NACK information bit in response to a latest NDI bit transmitted by the BS being different from a latest NDI bit received by the UE.

5. The method of claim 1, wherein the NDI bit is zero, and wherein the NDI bit is for the non-scheduled TB.

6. The method of claim 1, wherein the NDI bit is zero, and wherein the NDI bit is for a semi-persistent scheduling (SPS) physical downlink shared channel (PDSCH).

7. A user equipment (UE) for wireless communication, comprising:
   at least one memory; and
   at least one processor coupled with the at least one memory and configured to cause the UE to:
      receive, from a base station (BS), a signaling configuring a plurality of downlink (DL) hybrid automatic repeat request (HARQ) processes, and downlink control information (DCI) requesting feedback for each DL HARQ process of the plurality of DL HARQ processes;
      generate, for each DL HARQ process of the plurality of DL HARQ processes, two information bits based on a maximum number of transport blocks (TBs) that can be carried by each DL HARQ process of the plurality of DL HARQ processes being two and spatial bundling not being configured, wherein the two information bits comprise a HARQ-acknowledge (ACK) information bit associated with a scheduled TB and a HARQ-negative ACK (NACK) information bit associated with a non-scheduled TB;
      for each DL HARQ process of the plurality of DL HARQ processes, generate the feedback based on an associated new data indicator (NDI) bit and the two information bits, wherein the HARQ-ACK information bit is before the HARQ-NACK information bit in the feedback; and
      transmit, to the BS, a codebook including the feedback for each DL HARQ process of the plurality of DL HARQ processes, wherein the feedback for each DL HARQ process of the plurality of DL HARQ processes is concatenated in the codebook in an order of DL HARQ process number.

8. The UE of claim 7, wherein the at least one processor is further configured to cause the UE to:
   for each DL HARQ process of the plurality of DL HARQ processes, generate the HARQ-NACK information bit in response to a latest NDI bit transmitted by the BS being different from a latest NDI bit received by the UE.

9. The UE of claim 8, wherein the DCI includes the latest NDI bit transmitted by the BS associated with each DL HARQ process of the plurality of DL HARQ processes.

10. The UE of claim 9, wherein a number of fields in the DCI indicate the latest NDI bit transmitted by the BS associated with each DL HARQ process of the plurality of DL HARQ processes.

11. The UE of claim 7, wherein, for each DL HARQ process of the plurality of DL HARQ processes, the two information bits include at least the HARQ-ACK information bit in response to the DL HARQ process being correctly decoded, or the HARQ-NACK information bit in response to the DL HARQ process not being correctly decoded.

12. The UE of claim 7, wherein the at least one processor is further configured to cause the UE to:
generate, for each DL HARQ process of the plurality of DL HARQ processes, the feedback by performing modulo 2 addition between at least one information bit of the two information bits and a latest NDI bit received by the UE.

13. The UE of claim 7, wherein the NDI bit is zero, and wherein the NDI bit is for the non-scheduled TB.

14. The UE of claim 7, wherein, the at least one processor is further configured to cause the UE to:
generate, for each DL HARQ process of the plurality of DL HARQ processes, the feedback based on a bit level operation among the two information bits and one or more latest NDI bits received by the UE if the maximum number of TBs that can be carried by each DL HARQ process of the plurality of HARQ process is two and the spatial bundling is configured.

15. The UE of claim 7, wherein the NDI bit is zero, and wherein the NDI bit is for a semi-persistent scheduling (SPS) physical downlink shared channel (PDSCH).

16. The UE of claim 7, wherein the codebook further includes an additional information bit for DCI indicating DL semi-persistent scheduling (SPS) release.

17. The UE of claim 7, wherein code block group (CBG)-level information bits for a TB correspond to a same NDI bit associated with the TB based on CBG-based retransmission being configured.

18. The UE of claim 7, wherein the DCI requesting the feedback for each DL HARQ process of the plurality of DL HARQ processes has a same format as a DCI scheduling at least one of a physical downlink shared channel (PDSCH) transmission or a physical uplink shared channel (PUSCH) transmission.

19. A base station (BS) for wireless communication, comprising:
at least one memory; and
at least one processor coupled with the at least one memory and configured to cause the BS to:
transmit, to a user equipment (UE), a signaling configuring a plurality of downlink (DL) hybrid automatic repeat request (HARQ) processes, and downlink control information (DCI) requesting feedback for each DL HARQ process of the plurality of DL HARQ processes; and
receive, from the UE, a codebook including the feedback for each DL HARQ process of the plurality of DL HARQ processes, wherein:
the feedback for each DL HARQ process of the plurality of DL HARQ processes is based on an associated new data indicator (NDI) bit and two information bits;
a maximum number of transport blocks (TBs) that can be carried by each DL HARQ process of the plurality of DL HARQ processes is two and spatial bundling is not configured;
the two information bits comprise a HARQ-acknowledge (ACK) information bit associated with a scheduled TB and a HARQ-negative ACK (NACK) information bit associated with a non-scheduled TB;
the HARQ-ACK information bit is before the HARQ-NACK information bit in the feedback; and
the feedback for each DL HARQ process of the plurality of DL HARQ processes is concatenated in the codebook in an order of DL HARQ process number.

20. A processor for wireless communication, comprising:
at least one controller coupled with at least one memory and configured to cause the processor to:
receive, from a base station (BS), a signaling configuring a plurality of downlink (DL) hybrid automatic repeat request (HARQ) processes, and downlink control information (DCI) requesting feedback for each DL HARQ process of the plurality of DL HARQ processes;
generate, for each DL HARQ process of the plurality of DL HARQ processes, two information bits based on a maximum number of transport blocks (TBs) that can be carried by each DL HARQ process of the plurality of DL HARQ processes being two and spatial bundling not being configured, wherein the two information bits comprise a HARQ-acknowledge (ACK) information bit associated with a scheduled TB and a HARQ-negative ACK (NACK) information bit associated with a non-scheduled TB;
for each DL HARQ process of the plurality of DL HARQ processes, generate the feedback based on an associated new data indicator (NDI) bit and the two information bits, wherein the HARQ-ACK information bit is before the HARQ-NACK information bit in the feedback; and
transmit, to the BS, a codebook including the feedback for each DL HARQ process of the plurality of DL HARQ processes, wherein the feedback for each DL HARQ process of the plurality of DL HARQ processes is concatenated in the codebook in an order of DL HARQ process number.

* * * * *